United States Patent
Kang et al.

(10) Patent No.: US 8,675,594 B2
(45) Date of Patent: Mar. 18, 2014

(54) METHOD FOR SENSING SPECTRUM AND ARRANGING QUIET PERIOD IN COGNITIVE RADIO SYSTEM, CUSTOMER PREMISE EQUIPMENT, BASE STATION AND SUPERFRAME STRUCTURE USING THE SAME

(75) Inventors: Bub-Joo Kang, Daejeon (KR); Gwangzeen Ko, Seoul (KR); Sung-Hyun Hwang, Daejeon (KR); Myung-Sun Song, Daejeon (KR); Chang-Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 749 days.

(21) Appl. No.: 12/279,248

(22) PCT Filed: Feb. 14, 2007

(86) PCT No.: PCT/KR2007/000776
§ 371 (c)(1),
(2), (4) Date: Aug. 13, 2008

(87) PCT Pub. No.: WO2007/094604
PCT Pub. Date: Aug. 23, 2007

(65) Prior Publication Data
US 2009/0016293 A1    Jan. 15, 2009

(30) Foreign Application Priority Data

Feb. 14, 2006 (KR) .................. 10-2006-0014230
Feb. 13, 2007 (KR) .................. 10-2007-0014976

(51) Int. Cl.
*H04W 4/00* (2009.01)
*H04L 12/28* (2006.01)

(52) U.S. Cl.
USPC .................................. 370/330; 370/431

(58) Field of Classification Search
None
See application file for complete search history.

(56) References Cited

U.S. PATENT DOCUMENTS 5,059,836 A * 10/1991 Lee et al. .......... 327/557
7,529,265 B1 * 5/2009 Nicholas .......... 370/445
2001/0049281 A1 * 12/2001 Duplessis et al. .......... 455/422

(Continued)

FOREIGN PATENT DOCUMENTS

KR   2004-0019039 A   3/2004
KR   2004-0019322 A   3/2004

OTHER PUBLICATIONS

Ghurumuruhan Ganesan, et al; "Cooperative Spectrum Sensing in Cognitive Radio Networks", New Frontiers in dynamic Spectrum Access Networks, 2005. DySPAN 2005, 2005 First IEEE International Symposium on, Nov. 8-11, 2005, pp. 137-143.

Natasha Devroye, et al; "Cognitive Multiple Access Networks", Information Theory, 2005. ISIT 2005. Proceedings. International Symposium on, Sep. 4-9, 2005 pp. 57-61.

(Continued)

*Primary Examiner* — Eunsook Choi
(74) *Attorney, Agent, or Firm* — NSIP Law (57) ABSTRACT

Provided are methods of spectrum sensing and assigning quiet periods in a cognitive radio system in order to increase the reliability of detection regarding whether an incumbent user appears in his/her frequency channel, customer premises equipment (CPE), a base station, and the structure of a super frame for performing the methods. The spectrum sensing method includes communicating with a base station (BS) and performing spectrum sensing for frequency channels having quiet periods (QPs) during the QPs of the frequency channels used in the cognitive radio system, wherein the QPs of the frequency channels do not overlap each other

5 Claims, 9 Drawing Sheets

(56) References Cited

U.S. PATENT DOCUMENTS

| | | | |
|---|---|---|---|
| 2003/0085766 A1* | 5/2003 | Rogerson | 331/57 |
| 2004/0013128 A1* | 1/2004 | Moreton et al. | 370/447 |
| 2006/0114826 A1* | 6/2006 | Brommer | 370/230 |
| 2007/0070960 A1* | 3/2007 | Barak et al. | 370/338 |
| 2007/0147410 A1* | 6/2007 | Kumar | 370/431 |
| 2007/0165586 A1* | 7/2007 | Taylor et al. | 370/338 |
| 2008/0253347 A1* | 10/2008 | Cordeiro et al. | 370/343 |
| 2009/0010210 A1* | 1/2009 | Hiertz et al. | 370/329 |
| 2009/0067354 A1* | 3/2009 | Gao et al. | 370/310 |
| 2009/0252048 A1* | 10/2009 | Liang et al. | 370/252 |

OTHER PUBLICATIONS

Pak Kay Tang, et al; "Performance of Secondary Radios in Spectrum Sharing with Prioritized Primary Access", Military Communications Conference, 2006. MILCOM 2006, Oct. 2006 pp. 1-7.

Simon Haykin; "Cognitive Radio: Brain-Empowered Wireless Communications" IEEE Journal on Selected Areas in Communications, vol. 23, No. 2, Feb. 2005, pp. 201-220.

Amir Ghasemi, et al; "Collaborative Spectrum Sensing for Opportunistic Access in Fading Environments", New Frontiers in Dynamic Spectrum Access Networks, 2005. DySPAN 2005. 2005 First IEEE International Symposium on, Nov. 8-11, 2005, pp. 131-135.

* cited by examiner

METHOD FOR SENSING SPECTRUM AND ARRANGING QUIET PERIOD IN COGNITIVE RADIO SYSTEM, CUSTOMER PREMISE EQUIPMENT, BASE STATION AND SUPERFRAME STRUCTURE USING THE SAME

TECHNICAL FIELD

The present invention relates to spectrum sensing technology used in cognitive radio technology, and more particularly, to methods of spectrum sensing and assigning quiet periods in a cognitive radio system in order to more accurately detect whether an incumbent user appears in his/her frequency channel that is being currently used by cognitive radio equipment, customer premises equipment (CPE), a base station, and the structure of a super frame, which are used to perform the methods.

BACKGROUND ART

In cognitive radio systems, cognitive radio equipment uses an incumbent user's frequency band (or frequency channel) when the incumbent user does not occupy the frequency band. Examples of cognitive radio equipment are base stations and customer premises equipments (CPEs), which are included in cognitive radio systems. Incumbent users may be referred to as primary users. Cognitive radio systems may be referred to as secondary user systems.

In cognitive radio systems, spectrum sensing technology examines the spectrum of a frequency band in order to allow cognitive radio equipment to use an incumbent user's frequency channel and check if the incumbent user appears in the frequency channel when the cognitive radio equipment uses the frequency channel.

Cognitive radio systems basically must guarantee the vested rights of incumbent users to use their own frequency channels as much as they can. To this end, another spectrum sensing technology for more accurately detecting whether an incumbent user's frequency channel is preoccupied by cognitive radio equipment, i.e., whether an incumbent user appears in the frequency channel, is needed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Technical Goal of the Invention

The present invention provides methods of spectrum sensing and assigning quiet periods in a cognitive radio system in order to increase the reliability of detection regarding whether an incumbent user appears in his/her frequency channel, customer premises equipment (CPE), a base station, and the structure of a super frame for performing the methods.

Disclosure of the Invention

According to an aspect of the present invention, there is provided a spectrum sensing method performed by customer premises equipment (CPE) in a cognitive radio system comprising: communicating with a base station (BS); and performing spectrum sensing for frequency channels having quiet periods (QPs) during the QPs of the frequency channels used in the cognitive radio system, wherein the QPs of the frequency channels do not overlap each other.

Each super frame of the cognitive radio system may include a plurality of frames, locations of the frames including QPs differ from each other between different frequency channels.

Each super frame of the cognitive radio system may include a single QP per frequency channel.

The method may further include: receiving information on the assignment of the QPs of the frequency channels from the BS, wherein the spectrum sensing is performed based on the information on the assignment of the QPs.

The method may further comprise: notifying the BS about a spectrum sensing result.

The QPs of frequency channels which are channel-bonded do not overlap each other.

Each super frame of the cognitive radio system may include the plurality of frames, the locations of the frames including QPs differ from each other between different frequency channels, the locations of the frames including QPs are adjacent to each other between the frequency channels which are channel-bonded.

The locations of the frames including QPs may be adjacent to each other in the order of the frequency channels between the frequency channels which are channel-bonded.

According to another aspect of the present invention, there is provided a spectrum sensing method performed by a BS in a cognitive radio system comprising: communicating with at least one CPE; and performing spectrum sensing for frequency channels having QPs during the QPs of the frequency channels used in the cognitive radio system, wherein the QPs of the frequency channels do not overlap each other.

Each super frame of the cognitive radio system may include a plurality of frames, locations of the frames including QPs differ from each other between different frequency channels.

Each super frame of the cognitive radio system may include a single QP per frequency channel.

The method may further comprise: transmitting information on the assignment of the QPs of the frequency channels to the at least one CPE.

The method may further comprise: receiving a spectrum sensing result from the at least one CPE.

QPs of frequency channels which are channel-bonded may do not overlap each other.

Each super frame of the cognitive radio system may include a plurality of frames, the locations of the frames including QPs differ from each other between different frequency channels, the locations of the frames including QPs are adjacent to each other between the frequency channels which are channel-bonded.

The locations of the frames including QPs may be adjacent to each other in the order of the frequency channels between the frequency channels which are channel-bonded.

According to another aspect of the present invention, there is provided a method of assigning QPs to perform spectrum sensing in a cognitive radio system comprising: determining at least one frequency channel to which the QPs are assigned; and establishing time locations of the QPs of the at least one frequency channel, wherein the establishing of the time locations comprises: if two or more frequency channels are determined, establishing time locations of QPs of the frequency channels so that the QPs do not overlap each other between different frequency channels.

The establishing of the time locations may comprise: establishing time locations of the QPs based on a channel conversion time of a device belonging to the cognitive radio system.

Each super frame of the cognitive radio system may include a plurality of frames, wherein the establishing of the time locations further comprises: forming the super frames so that the time locations of the frames including QPs differ from each other between different frequency channels.

The establishing of the time locations may further comprise: assigning the QPs of frequency channels which are channel-bonded to the super frames so that the time locations of the frames including the QPs are adjacent to each other in the order of the frequency channels.

According to another aspect of the present invention, there is provided CPE in a cognitive radio system comprising: a transmitter/receiver communicating with a BS; and a sensor performing spectrum sensing for frequency channels having QPs during the QPs of the frequency channels used in the cognitive radio system, wherein the QPs of the frequency channels do not overlap each other.

Each super frame of the cognitive radio system may include a plurality of frames, locations of the frames including QPs differ from each other between different frequency channels.

The transmitter/receiver may receive information on the assignment of the QPs of the frequency channels from the BS, the sensor performs spectrum sensing based on the information on the assignment of the QPs.

The transmitter/receiver may notify a spectrum sensing result of the BS.

According to another aspect of the present invention, there is provided a BS in a cognitive radio system comprising: a transmitter/receiver communicating with at least one CPE; and a sensor performing spectrum sensing for frequency channels having QPs during the QPs of the frequency channels used in the cognitive radio system, wherein the QPs of the frequency channels do not overlap each other.

Each super frame of the cognitive radio system may include a plurality of frames, locations of the frames including QPs differ from each other between different frequency channels.

The transmitter/receiver may transmit information on the assignment of the QPs of the frequency channels to the at least one CPE.

The transmitter/receiver may receive a spectrum sensing result from the at least one CPE.

According to another aspect of the present invention, there is provided an apparatus for assigning QPs to perform spectrum sensing in a cognitive radio system comprising: a determiner determining at least one frequency channel to which the QPs are assigned; and an establisher establishing time locations of the QPs of the at least one frequency channel, wherein the establisher, if the determiner determines two or more frequency channels, establishes the time locations of QPs of the frequency channels so that the QPs do not overlap each other between different frequency channels.

The establisher may establish the time locations of the QPs based on a channel conversion time of a device belonging to the cognitive radio system.

Each super frame of the cognitive radio system includes a plurality of frames, wherein the establisher forms the super frame so that the time locations of the frames including QPs differ from each other between different frequency channels.

According to another aspect of the present invention, there is provided a structure of a super frame for spectrum sensing performed by a BS or CPE in a cognitive radio system, wherein the super frame includes at least one QP in each of frequency channels used in the cognitive radio system, and the QPs of the frequency channels do not overlap each other.

The super frame may include a plurality of frames, and locations of the frames including QPs differ from each other between different frequency channels.

The super frame may include a single QP per frequency channel.

The QPs may be established based on a channel conversion time required by a sensor to perform spectrum sensing.

QPs of frequency channels which are channel-bonded may do not overlap each other.

The super frame may include a plurality of frames, locations of the frames including QPs differ from each other between different frequency channels, and the locations of the frames including QPs are adjacent to each other between the frequency channels which are channel-bonded.

Effect of the Invention

The present invention can increase the reliability of detection regarding whether an incumbent user appears in his/her frequency channel in a cognitive radio system.

BEST MODES FOR CARRYING OUT THE INVENTION

The present invention will now be described more fully with reference to the accompanying drawings.

The present invention relates to spectrum sensing technology for more accurately detecting whether an incumbent user's frequency channel is used by cognitive radio equipment, i.e., whether an incumbent user appears in the frequency channel.

More particularly, the present invention relates to distributed spectrum sensing technology for checking, by cognitive radio equipment, if an incumbent user appears in an incumbent user's frequency channel among frequency channels belonging to an active set. The active set is a set of frequency channels currently being used in a cognitive radio system and is a combination of active sets 1 and 2, which will be described later.

The definition of the active sets 1 and 2 is as follows.

Active set 1 $A_1=\{f|f$ is a frequency channel currently being used by cognitive radio equipment to transmit and receive information$\}$ Active set 2 $A_2=\{f|f$ is a frequency channel currently being used by a cognitive radio system, except frequency channels belonging to the active set 1$\}$ Besides the active sets 1 and 2, the definition of a candidate set, a remaining set, and an occupied set is as follows.

Candidate set $C=\{f|f$ is an unused frequency channel exceeding a communication quality threshold$\}$ Remaining set $R=\{f|f$ is an unused frequency channel not exceeding the communication quality threshold$\}$ Occupied set $O=\{f|f$ is a frequency channel being used by an incumbent user$\}$ The purpose of performing spectrum sensing in the cognitive radio system will now be briefly described. Spectrum sensing is performed for frequency channels belonging to the active set in order to detect the appearance of an incumbent user and vacate a frequency channel of the incumbent user. Spectrum sensing is performed for the candidate set, the remaining set, and the occupied set in order to detect whether an unused frequency channel exists and to efficiently use the detected unused frequency channel.

The present invention relates to, in particular, a method of performing spectrum sensing for frequency channels belonging to the active set during a QP. In order to clarify the subject matter of the present invention, the operation of the spectrum sensing for the candidate set, the remaining set, and the occupied set is not described. However, it will be fully understood by those of ordinary skill in the art that the spectrum sensing for the candidate set, the remaining set, and the occupied set can be applied to the present invention.

The QP is a period when cognitive radio equipment stops transmitting information through a frequency channel assigned to the cognitive radio equipment. In the present invention, different frequency channels have different locations of QPs.

Figure 1:
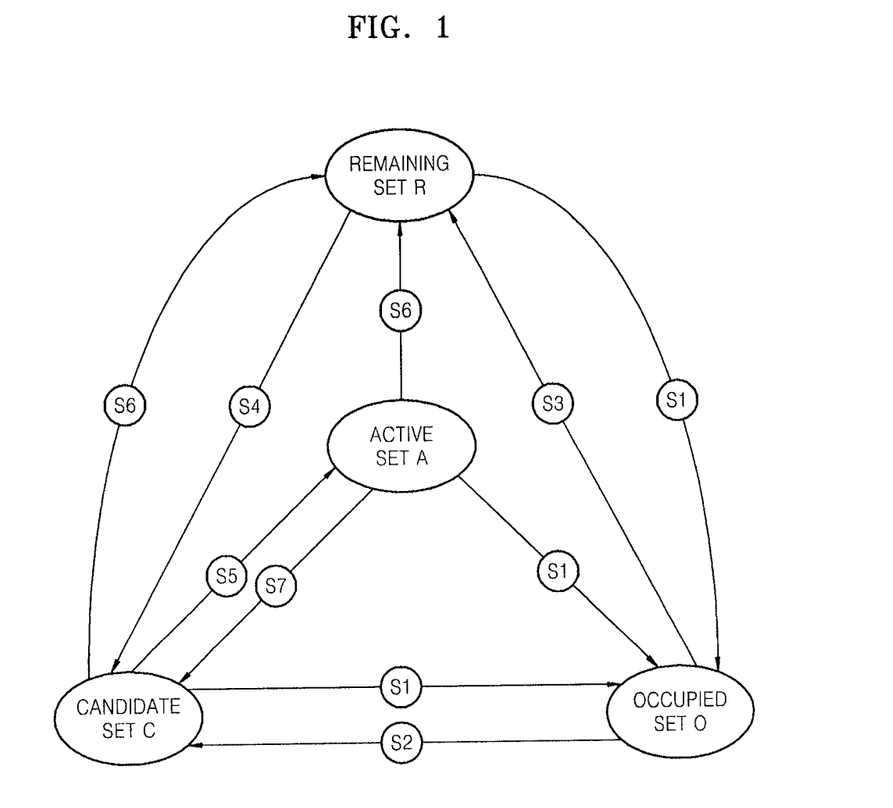
FIG. 1 is a state transition diagram of frequency channels according to an embodiment of the present invention.

FIG. 1 is a state transition diagram of frequency channels according to an embodiment of the present invention. In more detail, sets belonging to frequency channels change due to variations of state of frequency channels. Examples of variations of state of frequency channels are changes in appearance of an incumbent user, quality of frequency channels, or the like. Referring to FIG. 1, arrows S1 through S7 will now be described.

State transition of arrow S1: where a frequency channel belonging to an active set, a candidate set, and a remaining set is occupied by an incumbent user.

State transition of arrow S2: where communication quality of a frequency channel in an unused state after the incumbent user releases the frequency channel exceeds a communication quality threshold.

State transition of arrow S3: where communication quality of the frequency channel in an unused state after the incumbent user releases the frequency channel does not exceed the communication quality threshold.

State transition of arrow S4: where communication quality of a frequency channel belonging to the remaining set exceeds a communication quality threshold satisfying the requirement of the candidate set.

State transition of arrow S5: where a frequency channel belonging to the candidate set is assigned to a secondary user.

State transition of arrow S6: where communication quality of a frequency channel belonging to the candidate set does not exceed the communication quality threshold satisfying the requirement of the candidate set.

State transition of arrow S7: where communication quality of a frequency channel in an unused state after belonging to the active set, i.e., the frequency channel used and then released by the secondary user, exceeds the communication quality threshold satisfying the requirement of the candidate set.

In the present specification, for the descriptive convenience, the technical idea of the present invention is described using a wireless regional area network (WRAN) system among cognitive radio systems, i.e., secondary user systems. However, it will be fully understood by those of ordinary skill in the art that distributed spectrum sensing technology can be applied to any secondary user system as well as the WRAN system.

The WRAN system uses a V/UHF TV band using cognitive radio technology while an incumbent user is not using the V/UHF TV band. The WRAN system includes at least one WRAN base station (BS) and at least one item of customer premises equipment (CPE). The WRAN BS corresponds to a BS belonging to the cognitive radio system. The CPE corresponds to a terminal belonging to the cognitive radio system. The term WRAN device refers to the WRAN BS and the CPE, and corresponds to a cognitive radio device.

In the present specification, when the WRAN system includes a plurality of cells, the operation of the WRAN device included in a single cell will be described.

Figure 2:
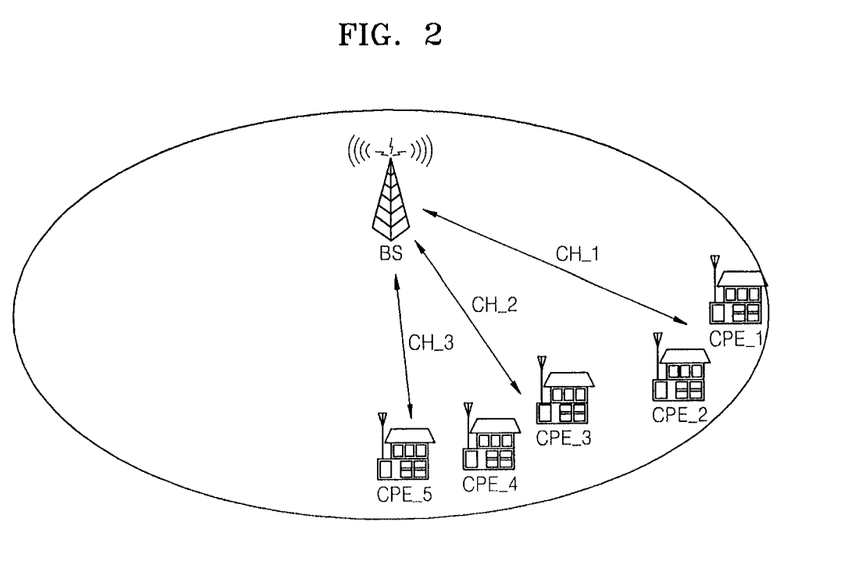
FIG. 2 illustrates an exemplary wireless regional area network (WRAN) system according to an embodiment of the present invention.

FIG. 2 illustrates an exemplary WRAN system according to an embodiment of the present invention. Referring to FIG. 2, the WRAN system comprises a WRAN BS and first through fifth CPEs CPE_1, CPE_2, CPE_3, CPE_4, and CPE_5.

An active set, conventional spectrum sensing technology, and a spectrum sensing method according to an embodiment of the present invention will now be described with reference to FIG. 2.

With respect to the active set, the first and second CPEs CPE_1 and CPE_2 communicate with the WRAN BS through a first frequency channel CH_1. The third and fourth CPEs CPE_3 and CPE_4 communicate with the WRAN BS through a second frequency channel CH_2. The fifth CPE_5 communicates with the WRAN BS through a third frequency channel CH_3.

In view of the first CPE CPE_1 or the second CPE CPE_2, an active set 1 is {CH_1} and active set 2 is {CH_2, CH_3}. In view of the third CPE CPE_3 or the fourth CPE CPE_4, an active set 1 is {CH_2} and active set 2 is {CH_1, CH_3}. In view of the fifth CPE CPE_5, an active set 1 is {CH_3} and active set 2 is {CH_1, CH_2}. In view of the WRAN BS, active set 1 is {CH_1, CH_2, CH_3}, and active set 2 is { }. Active set of the WRAN system is {CH_1, CH_2, CH_3}.

With regard to conventional spectrum sensing technology, the WRAN BS and the first through fifth CPEs CPE_1, CPE_2, CPE_3, CPE_4, and CPE_5 perform spectrum sensing for frequency channels belonging to the active set 1 in view of their respective position. For example, the fifth CPE CPE_5 performs spectrum sensing for the third frequency channel CH_3 to determine whether an incumbent user appears on the third frequency channel CH_3. If the fifth CPE CPE_5 determines that the incumbent user appears on the third frequency channel CH_3, the third CPE CPE_3 must release the third frequency channel CH_3 that is currently being used by the third CPE CPE_3, i.e., stop using the third frequency channel CH_3.

According to the conventional spectrum sensing technology, the spectrum sensing for the first frequency channel CH_1 is performed by the WRAN BS, the first CPE CPE_1, and the second CPE CPE_2, the spectrum sensing for the second frequency channel CH_2 is performed by the WRAN BS, the third CPE CPE_3, and the fourth CPE CPE_4, and the spectrum sensing for the third frequency channel CH_3 is performed by the WRAN BS and the fifth CPE CPE_5.

With respect to the spectrum sensing method according to an embodiment of the present invention, the WRAN BS and the first through fifth CPEs CPE_1, CPE_2, CPE_3, CPE_4, and CPE_5 perform spectrum sensing for frequency channels belonging to the active sets 1 and 2. The spectrum sensing for the first frequency channel CH_1, the second frequency channel CH_2, and the third frequency channel CH_3 is performed by all of the WRAN BS and the first through fifth CPEs CPE_1, CPE_2 CPE_3, CPE_4, and CPE_5.

Provided that the first through fifth CPEs CPE_1, CPE_2, CPE_3, CPE_4, and CPE_5 notify the WRAN BS of the result of the spectrum sensing, the comparison between the conventional spectrum sensing method and the spectrum sensing method of an embodiment of the present invention will now be described in terms of the effect.

According to the conventional spectrum sensing method, the WRAN BS can use three kinds of results of the spectrum sensing performed by the WRAN BS, the first CPE CPE_1, and the second CPE CPE_2 in order to determine whether the incumbent user appears on the first frequency channel CH_1. Meanwhile, according to the spectrum sensing method of an embodiment of the present invention, the WRAN BS can use six kinds of results of the spectrum sensing performed by the WRAN BS and the first through fifth CPEs CPE_1, CPE_2, CPE_3, CPE_4, and CPE_5 in order to determine whether the incumbent user appears on the first frequency channel CH_1. Therefore, it will be fully understood that the WRAN BS of an embodiment of the present invention that uses the results of the spectrum sensing more than those of the conventional WRAN BS can more accurately detect the appearance of the incumbent user. Furthermore, it will be fully understood that if an incumbent user of the first frequency channel CH_1 is located near the fifth CPE CPE_5, the spectrum sensing method of an embodiment of the present invention that performs the spectrum sensing for the first frequency channel CH_1 by the first through fifth CPEs CPE_1, CPE_2, CPE_3, CPE_4, and CPE_5 can more accurately detect whether the incumbent user of the first frequency channel CH_1 appears than the conventional spectrum sensing method.

The spectrum sensing for frequency channels belonging to active sets may be performed during a QP. Thus, the structure of a super frame including the QP will now be described.

The super frame used in the WRAN system of an embodiment of the present invention may have different QPs according to frequency channels. The reason for this is that it is difficult to realize an adaptive wideband filter to support a super frame where each frequency channel has the same location of QP in terms of time.

The interval between two adjacent two QPs in terms of time may be determined according to a channel conversion time of a sensor included in a WRAN device. When a first QP corresponds to the first frequency channel CH_1, and a second QP corresponds to the second frequency channel CH_2, the sensor performs the spectrum sensing for the first frequency channel CH_1 during the first QP and then converts the first frequency channel CH_1 into the second frequency channel CH_2 before arriving at the second QP.

Assuming that the super frame includes a plurality of frames, the assignment requirements of QPs will now be described in detail with reference to FIGS. 3, 4, and 5.

Figure 3:
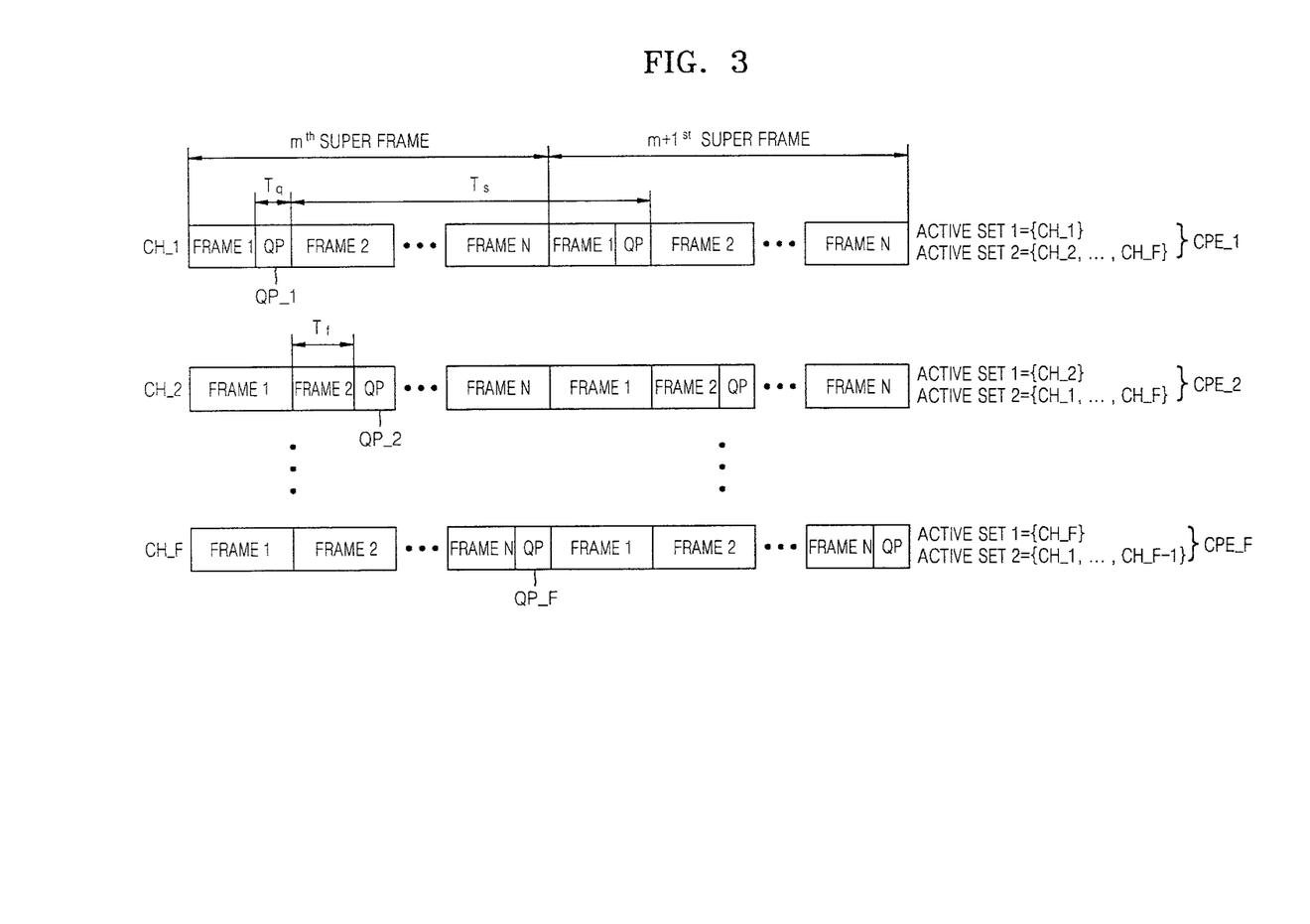
FIG. 3 illustrates super frame formats according to an embodiment of the present invention.
Figure 4:
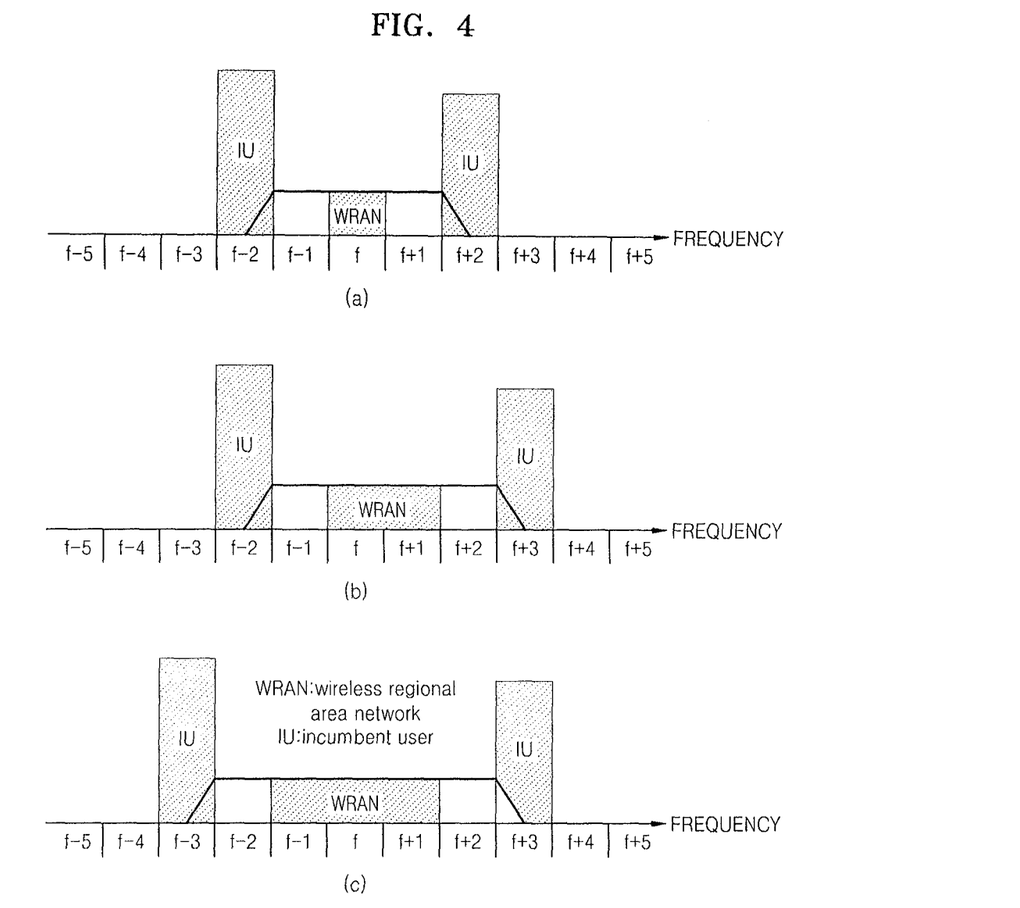
FIGS. 4A, 4B, and 4C illustrate assignments of frequency channels of an active set, a candidate set, a remaining set, and an occupied set according to an embodiment of the present invention.

FIG. 3 illustrates super frame formats according to an embodiment of the present invention. In detail, FIG. 3 illustrates super frames of respective frequency channels belonging to an active set.

Referring to FIG. 3, in a time division duplex (TDD) system, the first frequency channel CH_1 is assigned to the first CPE CPE_1, and the second through $F^{th}$ frequency channels CH_2 through CH_F are respectively assigned to the second through $F^{th}$ CPEs CPE_2 through CPE_F. In more detail, since a WRAN system currently uses the first through $F^{th}$ frequency channels CH_1 through CH_F, current active set is {CH_1, CH_2, through to CH_F}.

Each super frame includes N frames. One of the N frames includes a QP of the first through $F^{th}$ QPs QP_1, QP_2, through to QP_F having a period of time $T_q$. In detail, the first through $F^{th}$ QPs QP_1, QP_2, through to QP_F are established in a frame designated by a medium access control (MAC) layer.

A period of time $T_s$ denotes a sensing period of each frequency channel. A period of time $T_f$ denotes a channel conversion time of a sensor included in a WRAN device.

In particular, the remarkable characteristic of the super frame is that the first through $F^{th}$ QPs QP_1, QP_2, through to QP_F have different time locations according to frequency channels. In more detail, when two or more frequency channels belonging to an active set are currently being used, the first through $F^{th}$ QPS QP_1, QP_2, through to QP_F may not be assigned to the same frame. The above characteristic of the super frame is applied when the sensor included in the WRAN device performs the spectrum sensing for a single frequency channel each time. In particular, in the assignment of adjacent QPs in view of time the channel conversion time $T_f$ of the sensor may be considered. In other words, the sensor can convert the first frequency channel CH_1 into the second frequency channel CH_2 within the period of time $T_f$.

The length of each super frame is between 100 msec and 500 msec. The length of each frame is about 10 msec. The channel conversion time $T_f$ can vary according to the sensor in the super frame format. Considering the fact that the channel conversion time for performing hard handoff of a mobile communication terminal is generally 2~3 msec, the channel conversion time $T_f$ can be 2 msec in the super frame format.

FIGS. 4A, 4B, and 4C illustrate assignments of frequency channels of an active set, a candidate set, a remaining set, and an occupied set according to an embodiment of the present invention. Referring to FIG. 4A, a WRAN system uses a single frequency channel. Referring to FIGS. 4B and 4C, the WRAN system uses two channel-bonded frequency channels and three channel-bonded frequency channels, respectively. Frequency channels f−1, f, and the like have bandwidths of 6, 7, or 8 MHz.

Referring to FIG. 4A, a WRAN BS operates a frequency channel f, the active set A={f}, and the occupied set O={f−2, f+2}. Other unused frequency channels f−5, f−4, f−3, f−1, f+1, f+3, f+4, and f+5 are classified as the candidate set C={f−5, f−4, f+4, f+5} and the remaining set R={f−3, f−1, f+1, f+3} according to the quality of the frequency channels.

Referring to FIG. 4B, the WRAN BS operates the frequency channels f and f+1 which are channel-bonded, the active set A={f, f+1}, and the occupied set 0={f−2, f+3}. Other unused frequency channels f−5, f−4, f−3, f−1, f+2, f+4, and f+5 are classified as the candidate set C={f−5, f−4, f+5} and the remaining set R={f−3, f−1, f+2, f+4} according to the quality of the frequency channels.

Referring to FIG. 4C, the WRAN BS operates the frequency channels f−1, f, and f+1 which are channel-bonded, the active set A={f−1, f, f+1}, and the occupied set O={f−3, f+3}. Other unused frequency channels f−5, f−4, f−2, f+2, f+4, and f+5 are classified as the candidate set C={f−5, f+5} and the remaining set R={f−4, f−2, f+2, f+4} according to the quality of the frequency channels.

FIGS. 5A and 5B illustrate super frame formats according to another embodiment of the present invention. Referring to FIG. 5A, when a WRAN device uses three frequency channels f−1, f, and f+1 which are channel-bonded, QPs of the frequency channels f−1, f, and f+1 are assigned to $m^{th}$ and $m+1^{st}$ super frames. Referring to FIG. 5B, when the WRAN device uses two frequency channels f−1 and f which are channel-bonded, QPs of the frequency channels f−1 and f are assigned to $m^{th}$ and $m+1^{st}$ super frames.

The definition of the periods of time $T_q$, $T_f$, and $T_s$ are the same as described with reference to FIG. 3 and thus their descriptions will not be repeated here.

The assignment of QPs illustrated in FIGS. 5A and 5B satisfy the requirements for the assignment of QPs described above with reference to FIG. 2. In particular, in the present embodiment, QPs of the frequency channels which are channel-bonded are assigned adjacent to each other in the order of the frequency channels. A media access control (MAC) layer of the WRAN BS establishes the assignment of QPs and provides all CPEs with information on the assignment of QPs. The information on the assignment of QPs includes information on time locations of QPs according to frequency channels. The assigning of QPs based on a regular rule that QPs of the frequency channels which are channel-bonded are sequentially assigned as illustrated in FIGS. 5A and 5B results in a reduction of the amount of data required for transmitting the information on the assignment of QPs.

Figure 5:
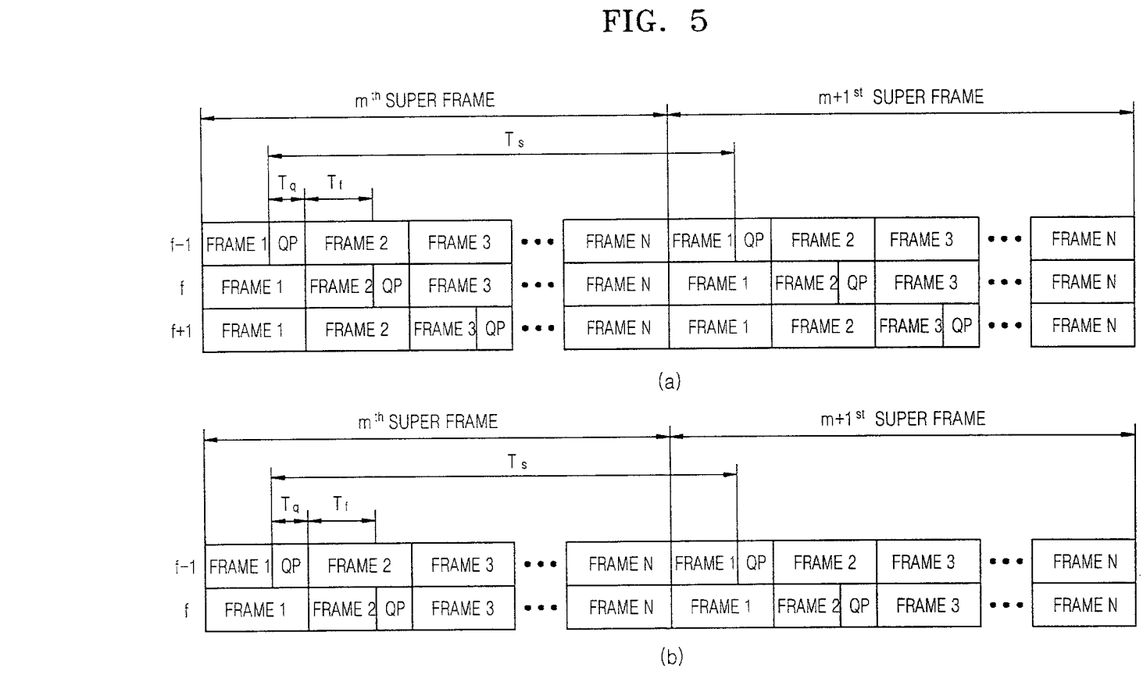
FIGS. 5A and 5B illustrate super frame formats according to another embodiment of the present invention.
Figure 6:
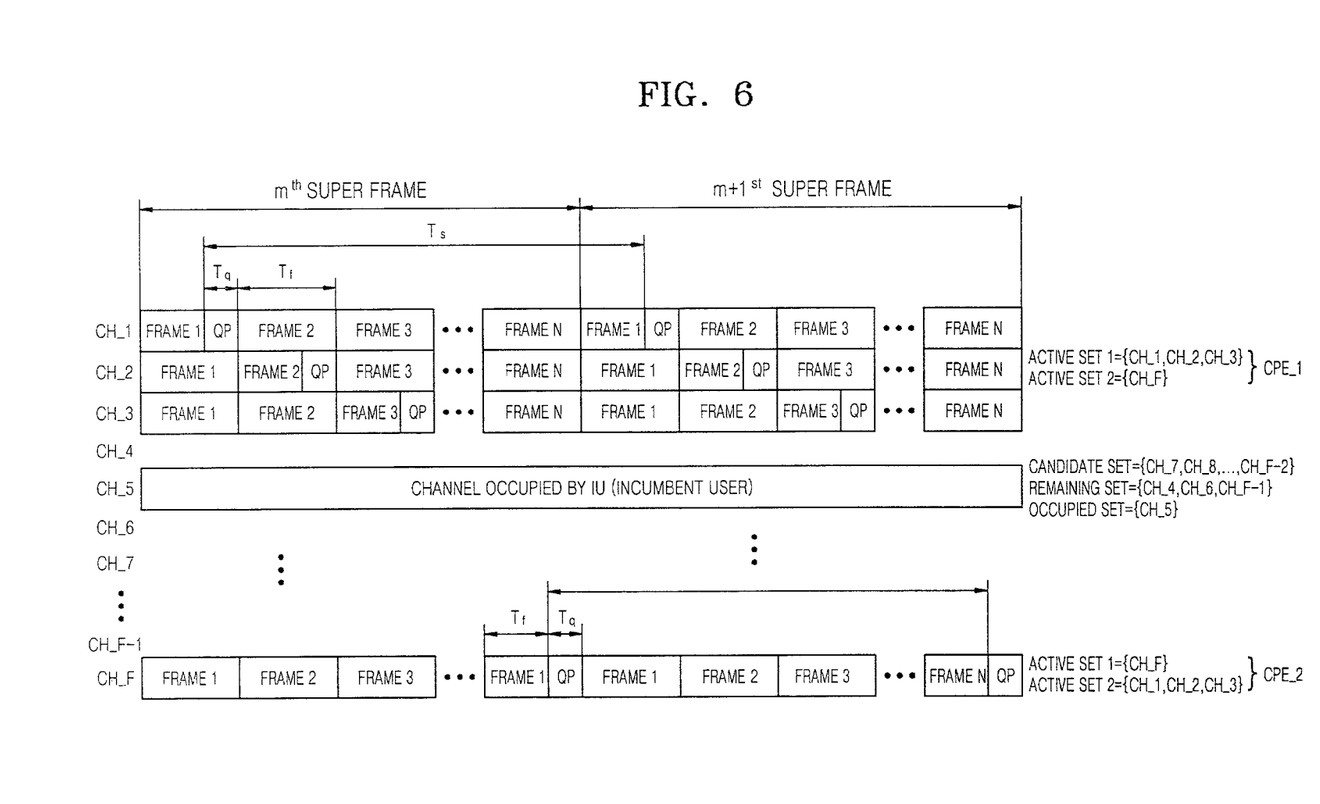
FIG. 6 illustrates super frame formats according to another embodiment of the present invention.

FIG. 6 illustrates super frame formats according to another embodiment of the present invention. Referring to FIG. 6, QPs of frequency channels which are channel-bonded as illustrated in FIG. 5 and are not channel-bonded as illustrated in FIG. 3 are assigned to $m^{th}$ and $m+1^{st}$ super frames.

The definition of the periods of time $T_q$, $T_f$, and $T_s$ are the same as those described with reference to FIG. 3 and thus their descriptions will not be repeated here.

The first CPE CPE_1 uses the first frequency channel CH_1, the second frequency channel CH_2, and the third frequency channel CH_3 which are channel-bonded. The second CPE CPE_2 uses an $F^{th}$ frequency channel CH_F.

Therefore, in view of the first CPE CPE_1, an active set 1 is {CH_1, CH_2, CH_3}, and an active set 2 is {CH_F}. Likewise, in view of the second CPE CPE_2, an active set 1 is {CH_F}, and an active set 2 is {CH_1, CH_2, CH_3}.

An occupied set is {CH_5} since an incumbent user occupies the fifth frequency channel CH_5.

Each CPE may have a different candidate set and remaining set since the candidate set and the remaining set vary according to quality of frequency channels as described above. For descriptive convenience, in the present embodiment, the first CPE CPE_1 and the second CPE CPE_2 have the same candidate sets {channel 7, channel 8, through to channel F−2}. The first CPE CPE_1 and the second CPE CPE_2 have the same remaining sets {channel 4, channel 6, channel F−1}.

Frames including QPs are sequentially adjacent to each other between the frequency channels CH_1, CH_2, and CH_3, which are channel-bonded, which is the same as those described with reference to FIG. 5. QPs of the frequency channels CH_1, CH_2, CH_3, CH_F belonging to the active sets 1 are assigned in different frames and thus do not overlap in terms of time as described with reference to FIG. 2.

Figure 7:
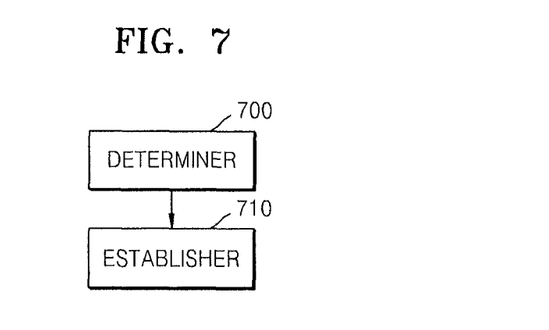
FIG. 7 is a block diagram of an apparatus for assigning quiet periods (QPs) in a cognitive radio system according to an embodiment of the present invention.

FIG. 7 is a block diagram of an apparatus for assigning QPs in a cognitive radio system according to an embodiment of the present invention. Referring to FIG. 7, the apparatus for assigning QPs in the cognitive radio system comprises a determiner 700 and an establisher 710. The apparatus for assigning QPs in the cognitive radio system of the present embodiment that satisfies the requirements for the assignment of QPs is generally included in a WRAN BS but the present invention is not limited thereto. That is, the apparatus for assigning QPs in the cognitive radio system of the present embodiment can be a separate apparatus of a WRAN system.

The determiner 700 determines at least one frequency channel to which QPs are assigned. The frequency channel to which QPs are assigned means a frequency channel belonging to an active set.

The establisher 710 establishes time locations of QPs of the at least one frequency channel. In particular, if two or more frequency channels are determined, the establisher 710 establishes time locations of QPs of each frequency channel so that the QPs do not overlap between different frequency channels. The establisher 710 may establish time locations of the QPs according to the channel conversion time of the cognitive radio equipment.

If each super frame of a cognitive radio system includes a plurality of frames as illustrated in FIGS. 3, 5, and 6, the establisher 710 forms the super frames to include in order to differentiate frames including QPs between different frequency channels. When the establisher 710 assigns QPs of frequency channels which are channel-bonded to the super frames, frames including QPs may be adjacent to each other in the order of the frequency channels.

Figure 8:
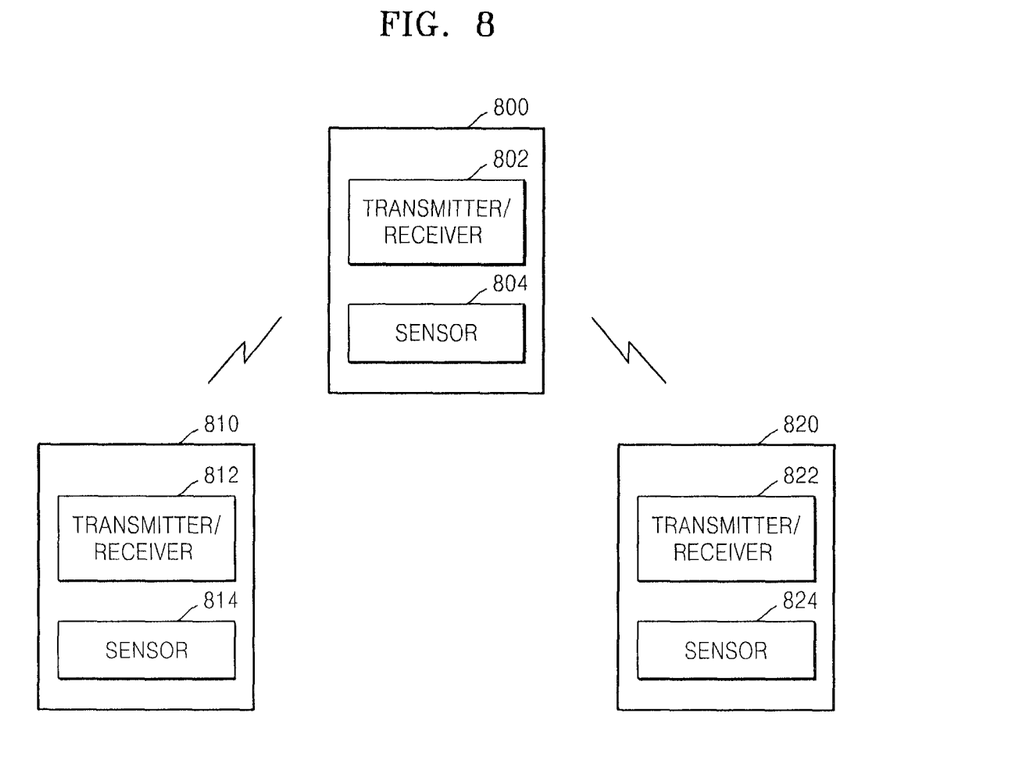
FIG. 8 is a block diagram of a WRAN system according to an embodiment of the present invention.

FIG. 8 is a block diagram of a WRAN system according to an embodiment of the present invention. Referring to FIG. 8, the WRAN system comprises a WRAN BS 800, a first CPE 810, and a second CPE 820. In the present embodiment, the WRAN BS 800 that includes the apparatus for assigning QPs in the cognitive radio system illustrated in FIG. 7 assigns QPs in advance.

The WRAN BS 800 comprises a transmitter/receiver 802 and a sensor 804. The first CPE 810 comprises a transmitter/receiver 812 and a sensor 814. The second CPE 820 comprises a transmitter/receiver 822 and a sensor 824.

The WRAN system of the present embodiment is a TDD system. The first frequency channel CH_1 is allocated to the first CPE 810. The second frequency channels CH_2 is allocated to the second CPE 820.

First, the operation of the WRAN BS 800 will now be described.

The transmitter/receiver 802 communicates with the first CPE 810 via the first frequency channel CH_1, communicates with the second CPE 820 via the second frequency channel CH_2, and does not perform transmission via the first or the second frequency channel CH_1 or CH_2 during a QP of the WRAN BS 800. The transmitter/receiver 802 may transmit information on the assignment of QPs of the first and second frequency channels CH_1 and CH_2 belonging to an active set to the first CPE 810 and the second CPE 820. The transmitter/receiver 802 may receive each result obtained by performing spectrum sensing for the first CPE 810 and the second CPE 820 from the first CPE 810 and the second CPE 820. Therefore, the WRAN BS 800 can utilize a result obtained by performing spectrum sensing and the results obtained by performing spectrum sensing for the first CPE 810 and the second CPE 820, thereby performing more reliable spectrum sensing (i.e. detection of the appearance of an incumbent user).

The sensor 804 performs spectrum sensing for the first frequency channel CH_1 during a QP of the first frequency channel CH_1, converts the first frequency channel CH_1 into the second frequency channel CH_2 before a QP of the second frequency channel CH_2, and performs spectrum sensing for the second frequency channel CH_2 during a QP of the second frequency channel CH_2.

Second, the operation of the first CPE 810 will now be described.

The transmitter/receiver 812 communicates with the WRAN BS 800 via the first frequency channel CH_1 but does not perform transmission during a QP of the first frequency channel CH_1. The transmitter/receiver 812 may receive information on the assignment of QPs of the first and second frequency channels CH_1 and CH_2 belonging to the active set from the WRAN BS 800. The transmitter/receiver 812 may notify a result obtained by performing spectrum sensing for the first CPE 810, i.e., a sensing result obtained by the sensor 814, of the WRAN BS 800.

The sensor 814 performs spectrum sensing for the first frequency channel CH_1 during the QP of the first frequency channel CH_1 based on the information on the assignment of QPs received from the transmitter/receiver 812, converts the first frequency channel CH_1 into the second frequency channel CH_2, and performs spectrum sensing for the second frequency channel CH_2 during the QP of the second frequency channel CH_2.

Third, the operation of the second CPE 820 will now be described.

The transmitter/receiver 822 communicates with the WRAN BS 800 via the second frequency channel CH_2 but does not perform transmission during a QP of the second frequency channel CH_2. The transmitter/receiver 822 may receive information on the assignment of QPs of the first and second frequency channels CH_1 and CH_2 belonging to the active set from the WRAN BS 800. The transmitter/receiver 822 may notify a result obtained by performing spectrum sensing for the second CPE 820, i.e., a sensing result obtained by the sensor 824, of the WRAN BS 800.

The sensor 824 performs spectrum sensing for the first frequency channel CH_1 during the QP of the first frequency channel CH_1 based on the information on the assignment of QPs received from the transmitter/receiver 822, converts the first frequency channel CH_1 into the second frequency channel CH_2, and performs spectrum sensing for the second frequency channel CH_2 during the QP of the second frequency channel CH_2.

Figure 9:
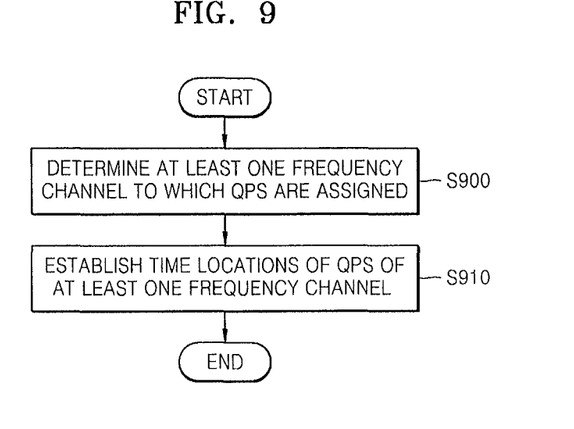
FIG. 9 is a flowchart illustrating a method of assigning QPs in a cognitive radio system according to an embodiment of the present invention.

FIG. 9 is a flowchart illustrating a method of assigning QPs in a cognitive radio system according to an embodiment of the present invention. The method of assigning QPs in the cognitive radio system will now be described with reference to FIG. 7.

Referring to FIG. 9, the determiner 700 determines at least one frequency channel to which QPs are assigned (S900). The frequency channel to which QPs are assigned means a frequency channel belonging to an active set.

The establisher 710 establishes time locations of QPs of the at least one frequency channel (S910). A method of establishing time locations of QPs is the same as described with reference to FIG. 7 and the description thereof will not be repeated here.

Figure 10:
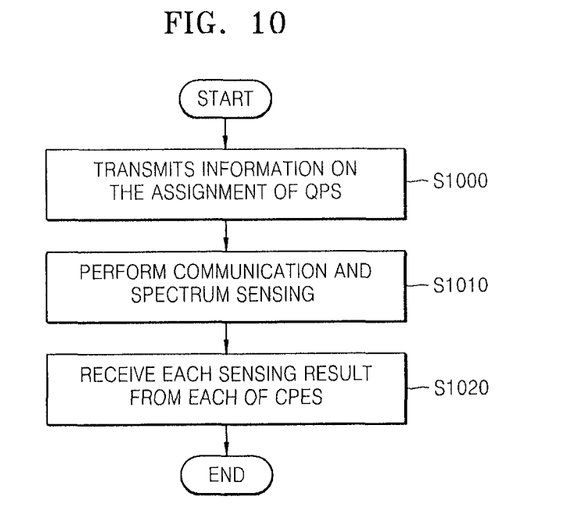
FIG. 10 is a flowchart illustrating a spectrum sensing method of a WRAN base station (BS) according to an embodiment of the present invention.

FIG. 10 is a flowchart illustrating a spectrum sensing method of a WRAN BS according to an embodiment of the present invention. The spectrum sensing method of the WRAN BS will now be described with reference to FIG. 8, assuming that QPs are previously assigned.

Referring to FIG. 10, the transmitter/receiver 802 transmits information on the assignment of QPs of the first and second frequency channels CH_1 and CH_2 to the first CPE 810 and the second CPE 820 (S1000).

The transmitter/receiver 802 communicates with the first CPE 810 via the first frequency channel CH_1, communicates with the second CPE 820 via the second frequency channel CH_2, and does not perform transmission via the first or the second frequency channel CH_1 or CH_2 during a QP of the WRAN BS 800 (S1010). In S1010, the sensor 804 performs spectrum sensing for the first frequency channel CH_1 during the QP of the first frequency channel CH_1, converts the first frequency channel CH_1 into the second frequency channel CH_2 before the QP of the second frequency channel CH_2, and performs spectrum sensing for the second frequency channel CH_2 during the QP of the second frequency channel CH_2.

The transmitter/receiver 802 receives each sensing result from the first CPE 810 and the second CPE 820 (S1020). Therefore, it will be fully understood by those of ordinary skill in the art that the spectrum sensing method can further finally detect whether an incumbent user appears on the frequency channels belonging to an active set based on the received sensing result and a result obtained by performing spectrum sensing of the WRAN BS.

Figure 11:
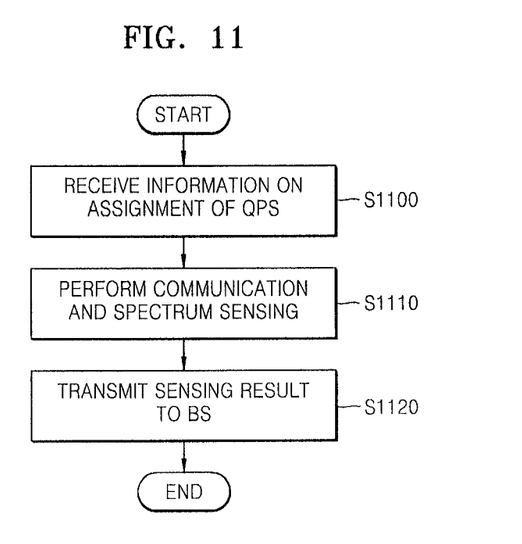
FIG. 11 is a flowchart illustrating a spectrum sensing method of customer premises equipment (CPE) according to an embodiment of the present invention.

FIG. 11 is a flowchart illustrating a spectrum sensing method of CPE according to an embodiment of the present invention. The spectrum sensing method of CPE will now be described with reference to FIG. 8.

Referring to FIG. 11, the transmitter/receiver 812 may receive information on the assignment of QPs of the first and second frequency channels CH_1 and CH_2 broadcasted from the WRAN BS 800 (S1100). The transmitter/receiver 812 communicates with the WRAN BS 800 through the first frequency channel CH_1 but does not communicate with the WRAN BS 800 during a QP of the first frequency channel CH_1 (S1110). In S1110, the sensor 814 performs spectrum sensing for the first frequency channel CH_1 during the QP of the first frequency channel CH_1 based on the information received in S1100, and performs spectrum sensing for the second frequency channel CH_2 during the QP of the second frequency channel CH_2. The communication of the transmitter/receiver 812 and the spectrum sensing performed by the sensor 814 occur in S1110 according to the super frames illustrated in FIGS. 3, 5, and 6.

The transmitter/receiver 812 transmits a sensing result obtained by the sensor 814 in S1110 to the WRAN BS 800 (S1120).

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion. Also, functional programs, code and code segments for accomplishing the present invention can be easily construed by programmer skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the present invention is defined not by the detailed description of the invention but by the appended claims, and all differences within the scope of the present invention will be construed as being included in the present invention.

The invention claimed is:

1. A method of assigning quiet periods (QPs) to perform spectrum sensing, performed by a terminal, a station, or an equipment in a cognitive radio system, the method comprising:
   determining at least one frequency channel to which the QPs are assigned; and
   establishing time locations of the QPs of the at least one frequency channel according to a channel conversion time,
   wherein the establishing of the time locations comprises:
      determining two or more frequency channels to establish time locations of QPs of the frequency channels so that the QPs do not overlap each other between different frequency channels,
   wherein each super frame of the cognitive radio system includes a plurality of frames,
   wherein the establishing of the time locations further comprises:
      forming the super frames so that the time locations of the frames including QPs differ from each other between different frequency channels, and
      assigning the QPs of frequency channels which are channel-bonded to the super frames so that the time locations of the frames including the QPs are adjacent to each other in the order of the frequency channels.

2. The method of claim 1, wherein the establishing of the time locations comprises:
   establishing time locations of the QPs based on the channel conversion time of a sensor or a device belonging to the cognitive radio system.

3. A non-transitory computer readable recording medium storing a program for executing a method of claim 1.

4. An apparatus including a non-transitory computer readable medium storing instructions for assigning QPs to perform spectrum sensing in a cognitive radio system, the apparatus comprising:
   a determiner determining at least one frequency channel to which the QPs are assigned; and
   an establisher establishing time locations of the QPs of the at least one frequency channel according to a channel conversion time,
   wherein the determiner determines two or more frequency channels and the establisher establishes the time locations of QPs of the frequency channels so that the QPs do not overlap each other between different frequency channels,
   wherein each super frame of the cognitive radio system includes a plurality of frames,
   wherein the establisher forms the super frame so that the time locations of the frames including QPs differ from each other between different frequency channels, and
   wherein the establisher assigns the QPs of frequency channels which are channel-bonded to the super frames so that the time locations of the frames including the QPs are adjacent to each other in the order of the frequency channels.

5. The apparatus of claim 4, wherein the establisher establishes the time locations of the QPs based on a channel conversion time of a sensor or a device belonging to the cognitive radio system.

* * * * *